United States Patent
Bialer et al.

(10) Patent No.: US 12,313,733 B2
(45) Date of Patent: May 27, 2025

(54) VELOCITY ESTIMATION AND ANGLE OFFSET CORRECTION IN SAR IMAGES BY PERFORMING IMAGE MATCHING

(71) Applicant: GM GLOBAL TECHNOLOGY OPERATIONS LLC, Detroit, MI (US)

(72) Inventors: Oded Bialer, Petah Tivak (IL); Dan Levi, Ganei Tikvah (IL)

(73) Assignee: GM Global Technology Operations LLC, Detroit, MI (US)

( * ) Notice: Subject to any disclaimer, the term of this patent is extended or adjusted under 35 U.S.C. 154(b) by 484 days.

(21) Appl. No.: 17/901,792

(22) Filed: Sep. 1, 2022

(65) Prior Publication Data

US 2024/0077607 A1    Mar. 7, 2024

(51) Int. Cl.
| | | |
|---|---|---|
| G01S 13/90 | (2006.01) | |
| G01S 13/58 | (2006.01) | |
| G01S 13/93 | (2020.01) | |
| G01S 13/931 | (2020.01) | |

(52) U.S. Cl.
CPC ........ G01S 13/9029 (2013.01); G01S 13/589 (2013.01); G01S 13/931 (2013.01)

(58) Field of Classification Search
CPC .. G01S 13/9029; G01S 13/589; G01S 13/931; G01S 7/417; G01S 13/9017; G01S 13/867; G01S 7/4004; G01S 13/58; G01S 13/9021

See application file for complete search history.

(56) References Cited

U.S. PATENT DOCUMENTS

| | | | |
|---|---|---|---|
| 2019/0018132 A1* | 1/2019 | Decker | G01S 13/04 |
| 2020/0062245 A1* | 2/2020 | Samotsvet | G06T 7/60 |
| 2020/0249341 A1* | 8/2020 | Valdes Garcia | G01C 11/02 |
| 2022/0065657 A1* | 3/2022 | Wang | G01C 21/387 |
| 2023/0213648 A1* | 7/2023 | Ray | G01S 13/9027 |
| | | | 342/25 A |

FOREIGN PATENT DOCUMENTS

WO    WO-2017032977 A1 *  3/2017  ......... G01S 13/867

* cited by examiner

*Primary Examiner* — Bernarr E Gregory
*Assistant Examiner* — Juliana Cross
(74) *Attorney, Agent, or Firm* — Quinn IP Law

(57) ABSTRACT

A method, system and vehicle that repetitively correct angle offsets in a synthetic aperture radar image of a vehicle while the vehicle is in motion by utilizing a radar system and a camera to determine accurate velocity of a measured object by matching angles of the object in the SAR image with angles of the object in the camera image, thereby reducing angle offsets of objects in the SAR image. The method includes obtaining an SAR image of another vehicle via a radar unit of the vehicle, obtaining a camera image of the other vehicle via a camera unit of the vehicle, determining an association between at least one object in the SAR image and a corresponding at least one object in the camera image, correcting a velocity estimation of the vehicle based on the determined association, and adjusting the SAR image based on the corrected velocity estimation.

20 Claims, 5 Drawing Sheets

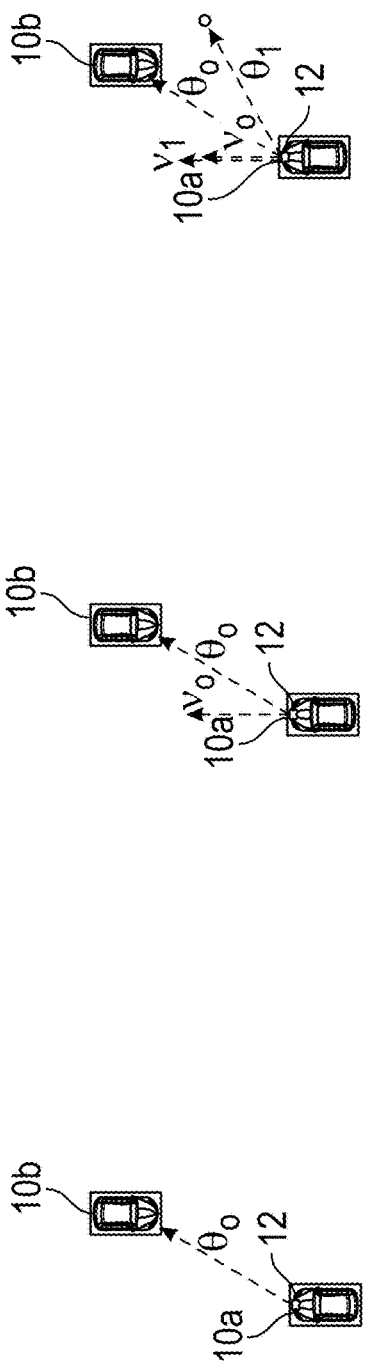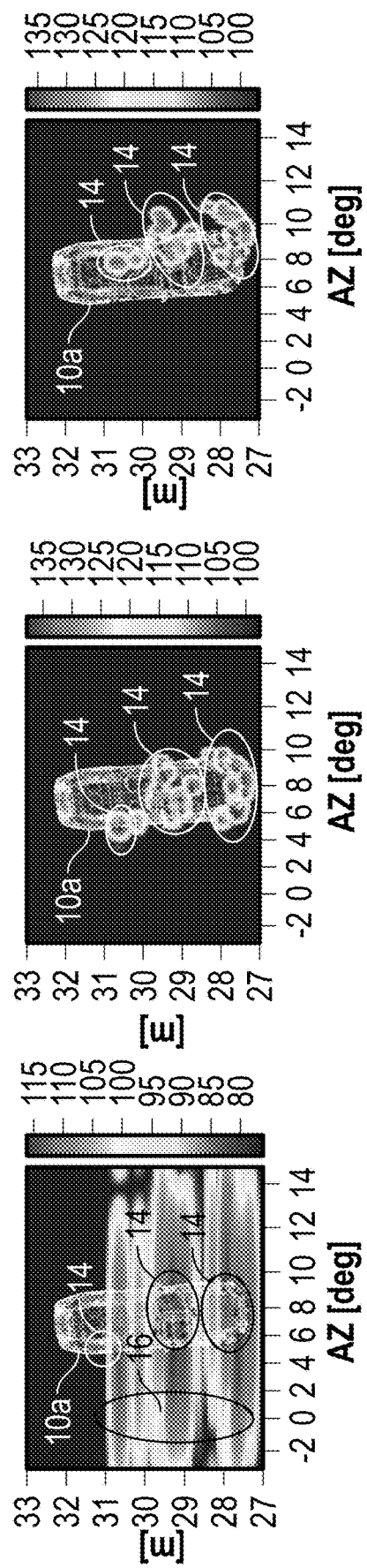
FIG. 1A
FIG. 1B
FIG. 1C $$f = Gv$$

$$f = \begin{bmatrix} f_1 \\ f_2 \\ \vdots \end{bmatrix} \; ; \; G = \begin{bmatrix} \cos(\theta_1) & \sin(\theta_1) \\ \vdots & \vdots \\ \cos(\theta_N) & \sin(\theta_N) \end{bmatrix} \; ; \; v = \begin{bmatrix} v_x \\ v_y \end{bmatrix} \; ; EV(v_o) = (G^H G)^{-1} G^H f$$

$$L = \frac{\|r_i - c_i\|}{\lambda \Sigma_{k \neq i} \|r_i - c_k\|}$$

FIG. 4B

$\min_{\Delta} |\text{median}(\theta_n^C) - \text{median}(\theta^S{}_m)|$  CA $s, t, \Delta \in \Omega$

SARA

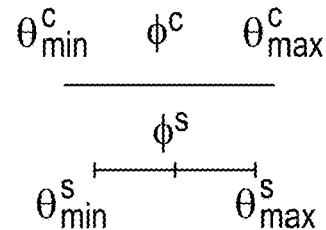

$\theta_n^C$  ANPC $\theta_m^S$  AMRS

MAO:  $\Omega = \text{argmax}_\Delta \{(\theta_{min}^S, \theta_{max}^S) + \Delta \cap (\theta_{min}^C, \theta_{max}^C)\}$ MINSAR:  $\theta_{min}^S = \min\{\theta_m^S\}$ ;

MAXSAR:  $\theta_{max}^S = \max\{\theta_m^S\}$

MINCAM:  $\theta_{min}^C = \min\{\theta_n^C\}$

MAXCAM:  $\theta_{max}^C = \max\{\theta_n^C\}$

$$f = \begin{bmatrix} f_1 \\ \vdots \\ f_N \end{bmatrix} \; ; \; G = \begin{bmatrix} \cos(\theta_1 + \Delta) & \sin(\theta_1 + \Delta) \\ \vdots & \vdots \\ \cos(\theta_N + \Delta) & \sin(\theta_N + \Delta) \end{bmatrix} \; ; \; EV(v_i) = \begin{bmatrix} v_x \\ v_y \end{bmatrix}$$

LSVE: $CEV(v_i) = (G^H G)^{-1} G^H f$

FIG. 6

VELOCITY ESTIMATION AND ANGLE OFFSET CORRECTION IN SAR IMAGES BY PERFORMING IMAGE MATCHING

INTRODUCTION

The present disclosure relates to velocity estimation and angle offset correction in synthetic aperture radar (SAR) images by performing image matching, specifically matching objects with images from a camera. More particularly, the present disclosure relates to correcting angle offsets in an SAR image of a vehicle in motion by considering angle offsets in SAR objects, which are due to velocity estimation error, by utilizing a camera image to correct the angle offsets in the SAR image.

The present disclosure estimates motion via a system and method that coherently combine a signal received over an extended interval while considering vehicle velocity in order to achieve enhanced angular resolution. Enhanced angular resolution in turn is provided by matching a radar image and a camera image of a same object in order to more accurately estimate motion of the vehicle.

Present SAR attains very high angular resolution by utilizing an extended aperture of radar due to motion. However, accurate estimation of the relative velocity of a radar unit or sensor is required since an error in estimated velocity results in an angle offset of a targeted object. Velocity estimation accuracy of present SAR may be insufficient for certain applications since velocity estimation errors cause angle offsets of measured objects in the SAR image, which cannot be detected by the radar, thereby resulting in severe angle offsets of objects in the SAR image that are proportional to the velocity error.

SUMMARY

The present disclosure addresses improves upon the current state of the art by providing a system and method for detecting and correcting angle offsets in a SAR image. The present disclosure utilizes a radar system and a camera to determine accurate velocity of a measured object by matching angles of the object in the SAR image with angles of the object in the camera image, thereby reducing angle offsets of objects in the SAR image.

The method for correcting angle offsets in a SAR image of a first vehicle, a host vehicle, is performed repetitively as the host vehicle is in motion, and includes obtaining an SAR image of a second vehicle, a target vehicle via a radar unit of the host vehicle, obtaining a camera image of the target vehicle via a camera unit of the host vehicle, determining an association between at least one object in the SAR image and a corresponding at least one object in the camera image, correcting a velocity estimation of the host vehicle based on the determined association, and adjusting the SAR image based on the corrected velocity estimation.

Correcting the velocity estimation may include performing coherent combining back-projection in one or more embodiments. Determining the association includes determining an angle offset between each of the at least one object in the SAR image and a corresponding each of the at least one object in the camera image. Determining the association further includes comparing a first angle of each of the at least one object in the SAR image to a second angle of the corresponding each of the at least one object in the camera image.

The above summary is not intended to represent every embodiment or every aspect of the present disclosure. Rather, the foregoing summary merely provides an exemplification of some of the novel concepts and features set forth herein. The above features and advantages, and other features and advantages, will be readily apparent from the following detailed description of illustrated embodiments and representative modes for carrying out the disclosure when taken in connection with the accompanying drawings and appended claims. Moreover, this disclosure expressly includes any and all combinations and sub-combinations of the elements and features presented above and below.

BRIEF DESCRIPTION OF THE DRAWINGS

FIGS. 1A to 1C illustrate conventional velocity estimation and impact of velocity error on a generated SAR image.

FIG. 4B illustrates a process for determining a loss between objects in both an obtained radar image and camera image according to an embodiment of the present disclosure.

FIG. 5 illustrates a process for determining an angle offset between associated objects in both an obtained radar image and camera image according to an embodiment of the present disclosure.

FIG. 6 illustrates a process for correcting an estimated velocity of a generated SAR image according to an embodiment of the present disclosure.

Figure 2:
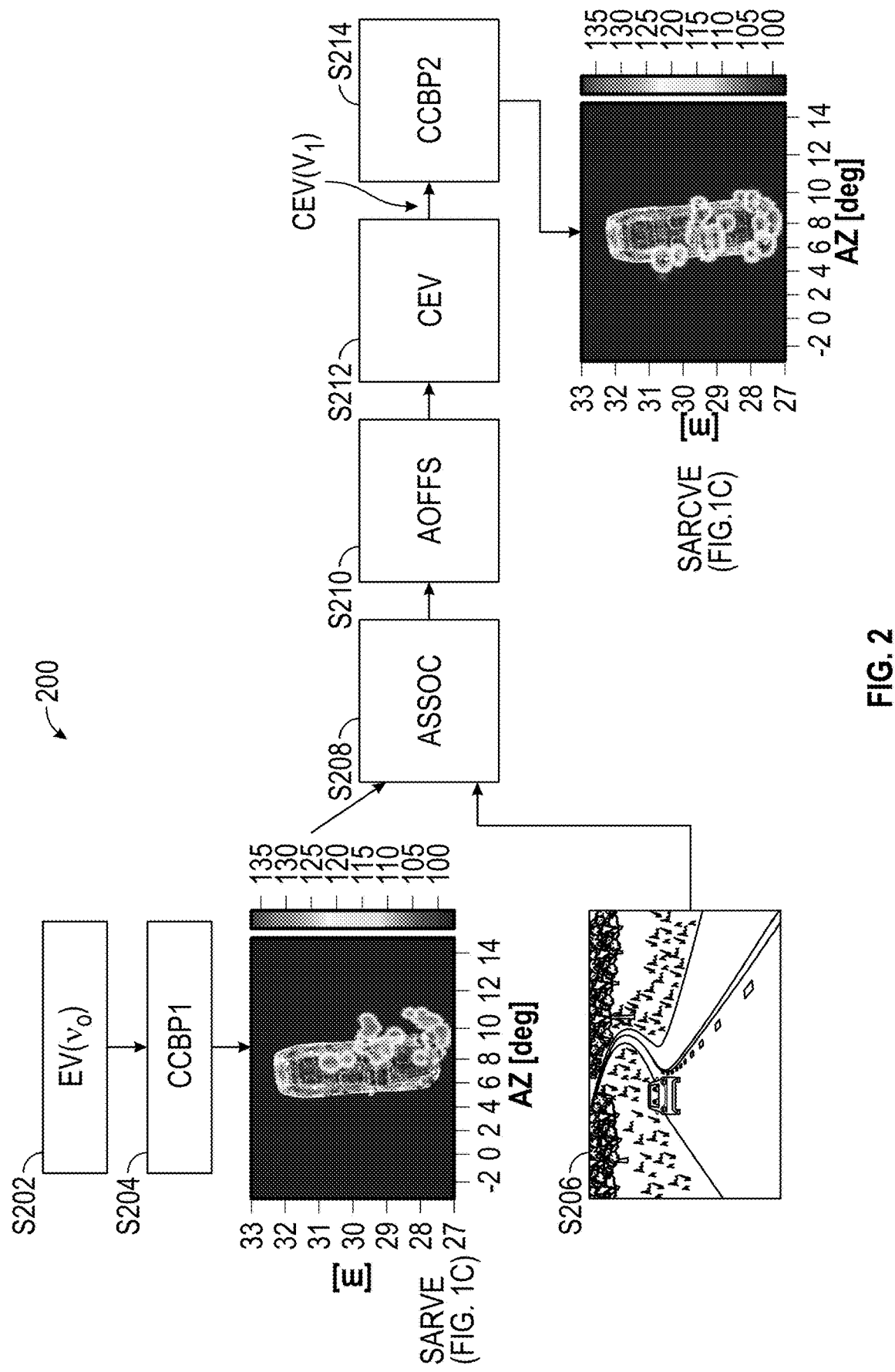
FIG. 2 illustrates a process for velocity estimation and mitigating impact of velocity error on a generated SAR image according to an embodiment of the present disclosure.

The present disclosure may be extended to modifications and alternative forms, with representative embodiments shown by way of example in the drawings and described in detail below. Inventive aspects of the disclosure are not limited to the disclosed embodiments. Rather, the present disclosure is intended to cover modifications, equivalents, combinations, and alternatives falling within the scope of the disclosure as defined by the appended claims.

DETAILED DESCRIPTION

The present disclosure is susceptible of embodiment in many different forms. Representative examples of the disclosure are shown in the drawings and described herein in detail as non-limiting examples of the disclosed principles. To that end, elements and limitations described in the Abstract, Introduction, Summary, and Detailed Description sections, but not explicitly set forth in the claims, should not be incorporated into the claims, singly or collectively, by implication, inference, or otherwise.

For purposes of the present description, unless specifically disclaimed, use of the singular includes the plural and vice versa, the terms "and" and "or" shall be both conjunctive and disjunctive, and the words "including", "containing", "comprising", "having", and the like shall mean "including without limitation". Moreover, words of approximation such as "about", "almost", "substantially", "generally", "approximately", etc., may be used herein in the sense of "at, near, or nearly at", or "within 0-5% of", or "within acceptable manufacturing tolerances", or logical combinations thereof.

As used herein, a component that is "configured to" perform a specified function is capable of performing the specified function without alteration, rather than merely having potential to perform the specified function after further modification. In other words, the described hardware, when expressly configured to perform the specified function, is specifically selected, created, implemented, utilized, programmed, and/or designed for the purpose of performing the specified function.

The present disclosure improves upon the current state of the art when estimating motion of a vehicle. In particular, the present solutions provide a system and method that coherently combine a signal received over an extended interval while considering velocity of a host vehicle in order to achieve enhanced angular resolution, which occurs by matching a radar image and a camera image of a same object in order to more accurately estimate motion of the host vehicle.

Present SAR attains very high angular resolution by utilizing an extended aperture of radar due to motion. However, accurate estimation of the relative velocity of a radar unit or sensor is required since an error in estimated velocity results in an angle offset of a targeted object. Velocity estimation accuracy of present SAR may be insufficient for certain applications, e.g., since velocity estimation errors cause angle offsets of measured objects in the SAR image, which cannot be detected by the radar, thereby resulting in severe angle offsets of objects in the SAR image that are proportional to the velocity error.

The present disclosure addresses this issue by providing a system and method for detecting and correcting angle offsets in the SAR image. The present disclosure utilizes a radar system and a camera to determine accurate velocity of a measured object by matching angles of the object in the SAR image with angles of the object in the camera image, thereby reducing angle offsets of objects in the SAR image.

Referring to the drawings, wherein like reference numbers refer to like features throughout the several views, FIGS. 1A to 1C illustrate conventional velocity estimation and impact of velocity error on a generated synthetic aperture radar (SAR) image. Specifically, FIGS. 1A to 1C illustrate utilizing SAR to more accurately determine a velocity of a first vehicle 10a ("host vehicle") by capturing a radar image of a second vehicle 10b ("target vehicle") located near the first vehicle 10a when the second vehicle 10b is offset at an angle $\theta_0$ from the first vehicle 10a with the first vehicle 10a illustrated on a graph of a range (RNG) in meters (m) and an Azimuth (AZ) in degrees (d).

FIG. 1A illustrates conventional velocity estimation without utilizing any SAR. FIG. 1B illustrates a theoretical result of applying SAR to the image illustrated in FIG. 1A with a highly-accurate estimation of both velocity ($v_0$) of the first vehicle 10a and an angle $\theta_0$ at which the second vehicle 10b is offset from the first vehicle 10a. FIG. 1C illustrates actual conventional estimation of the motion the first vehicle 10a with an inaccurate estimation of the velocity ($v_1$) of the first vehicle 10a that results in a corresponding inaccurate estimation of the angle $\theta_1$ at which the second vehicle 10b is offset from the first vehicle 10a.

FIG. 1A illustrates utilizing a radar unit 12, such as radar sensor, mounted in the first vehicle 10a to detect the second vehicle 10b by transmitting to and receiving from the second vehicle 10b radar signals, in which conventional processing without SAR results in significant inaccuracy in the focus of the processed image (as illustrated by shaded areas 16 in FIG. 1A) and corresponding less-than-highly-accurate determined velocity of the first vehicle 10a. As further illustrated in FIG. 1A, areas 14 with strongest reflections of the signals transmitted from the second vehicle 10b are dispersed throughout the processed image, thereby resulting in additional inaccuracy of the determined motion the first vehicle 10a.

As illustrated in FIG. 1B, the application of SAR with highly-accurate estimation of velocity $v_0$ would theoretically improve the significant inaccuracy in the focus 16 of the processed image. However, as illustrated in FIG. 1C, the determined motion of the first vehicle 10a is still not highly-accurate due to the velocity error $v_1$, which results in a proportional shift in a determined angle at which the second vehicle 10b is offset from the first vehicle 10a, specifically from $\theta_0$ to $\theta_1$ and a corresponding inaccuracy of the estimated motion of the first vehicle 10a.

FIG. 2 illustrates a process for velocity estimation of a vehicle and mitigating impact of velocity error on a generated SAR according to an embodiment of the present disclosure. As illustrated in FIG. 2, the process 200 includes determining Velocity (EV) of the first vehicle 10a EV($v_0$) (S202) and performing a first Coherent Combining Back-Projection (CCBP1) on an obtained radar image of the second vehicle 10b (S204) to generate a SAR image with a Velocity Error (SARVE) based on the second vehicle 10b, such as the image illustrated in FIG. 1C. A camera 18 is utilized to obtain a camera image of the second vehicle 10b (S206), preferably simultaneously with obtaining the radar image, and the obtained camera image of the second vehicle 10b is utilized to determine an association (ASSOC) between objects in both the obtained radar image and camera image of the second vehicle 10b (S208) with the ASSOC utilized to determine an Angle Offset (AOFFS) between each of the associated objects (S210) and to generate a Corrected EV (CEV($v_1$)) (S212). A second Coherent Combining Back-Projection (CCBP2) is then performed on the CEV($v_1$) (S214) to generate an SAR image with Corrected Velocity Error (SARCVE), similar to the theoretical goal illustrated in FIG. 1B.

The CCBP1 (S204) and CCB2 (S214) are each performed by utilizing a back-projection algorithm that coherent combines multiple frames for each generated EV($v_0$). The SARCVE reduces a proportional shift in the determined angle at which the second vehicle 10b is offset from the first vehicle 10a and further reduces corresponding inaccuracy of the estimated motion of the first vehicle 10a.

The process 200 is continually performed as the first vehicle 10a is moving. For example, the process 200 may be performed every 10 milliseconds (ms) in order to continually provide accurate information related to the motion of the vehicle 10a.

Figures 3, 4A:
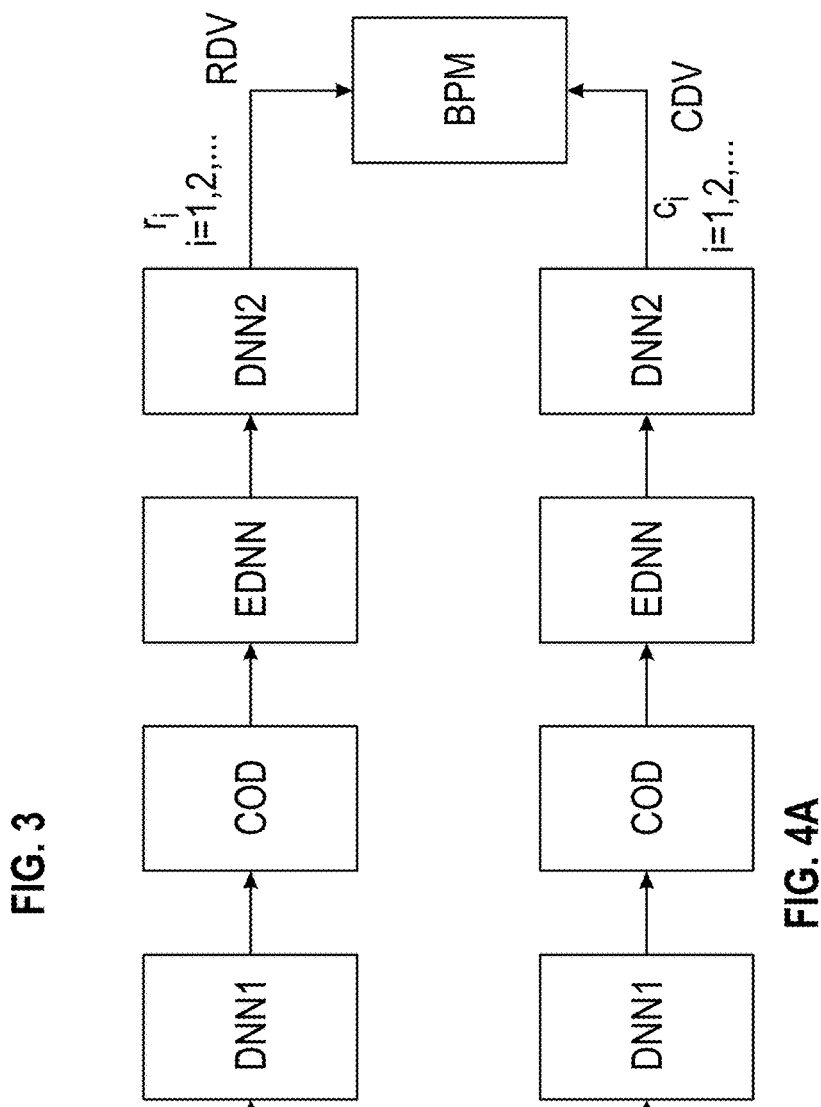
FIG. 3 illustrates a process for estimating initial vehicle velocity estimation according to an embodiment of the present disclosure.
FIG. 4A illustrates a process for determining determine an association between objects in both an obtained radar image and camera image according to an embodiment of the present disclosure.

FIG. 3 illustrates a process for estimating initial velocity of a vehicle according to an embodiment of the present disclosure. The generation of EV($v_0$) (S202) may be performed based on multiple Doppler detection points ($f_1$, $f_2$, . . . , $f_n$), where each Doppler detection point has a corresponding Doppler detection point angle ($\theta_1$, $\theta_2$, . . . , $\theta_n$), by applying the equation illustrated in FIG. 3.

FIG. 4A illustrates a process for determining an association between objects in both an obtained radar image and camera image according to an embodiment of the present disclosure. As illustrated in FIG. 4A, determining the ASSOC between objects in both the obtained radar image and camera image of the second vehicle 10b (S208) is performed by utilizing the generated SARVE and obtained camera image by applying a first Deep Neural Network (DNN1), applying Coarse Object Detection (COD), Extracting DNN (EDNN) features of the objects and applying a second DNN (DNN2) to each SARVE and corresponding obtained camera image to generate a corresponding Radar Descriptor Vector (RDV) ($r_i=1, 2, \ldots, n-1, n$) or Camera Descriptor Vector (CDV) ($c_i=1, 2, \ldots, n-1, n$) for each of multiple objects in the SARVE and obtained camera image. Bipartite Matching (BPM) is then performed between each of the corresponding $r_i$ and $c_i$ in each of the RDV and CDV.

FIG. 4B illustrates a process for determining a Loss between objects in both an obtained radar image and camera image according to an embodiment of the present disclosure. The process illustrated in FIG. 4A adjusts weights of the same objects in each of the SARVE and obtained camera image such that same objects in each of the SARVE and obtained camera image have a small descriptor distance and different objects in each of the SARVE and obtained camera image have a large descriptor distance according to the equation in FIG. 4B.

Minimizing L matches objects in the SARVE and obtained camera image. The matched objects are then utilized to adjust the SARVE.

FIG. 5 illustrates a process for determining an angle offset between associated objects in both an obtained radar image and camera image according to an embodiment of the present disclosure. As illustrated in FIG. 5, the AOFFS between the associated objects ($\Phi^S$, $\Phi^C$)(S210) is determined utilizing the illustrated formula to minimize an angle difference between centroids of objects in each of the associated objects and to maximize angle overlap between each of the associated objects, with $\Phi^S$ and $\Phi^C$ determined for each associated object in the obtained radar image and camera image. As illustrated in FIG. 5:

$\theta^c_n$ is an angle of an n-th pixel of an object in the camera image (ANPC);

$\theta^s_m$ is an angle of an mth reflection point of an object in the SAR image (AMRS);

$\Omega$ is a Maximum Angle Overlap (MAO) between an object in the camera image and the corresponding object in the SAR image;

$\theta^s_{min}$ is the minimum angle in each SAR image (MIN-SAR);

$\theta^s_{max}$ is the maximum angle in each SAR image (MAX-SAR);

$\theta^c_{min}$ is the minimum angle in each camera image (MIN-CAM);

$\theta^c_{max}$ is the maximum angle in each camera image (MAX-CAM);

Each of the $\Phi^c$ is between a minimum camera angle (CA) ($\theta^c_{min}$) and a maximum CA ($\theta^c_{max}$);

Each of the $\Phi^s$ is between a minimum SAR angle (SARA) ($\theta^s_{min}$) and a maximum SARA ($\theta^s_{max}$);

$\Delta$ is an Estimated Angular Offset between an object in the camera image and of the corresponding Object in the SAR image (EAOO).

FIG. 6 illustrates a process for correcting an estimated velocity of a generated SAR image according to an embodiment of the present disclosure. As illustrated in FIG. 6, the CVE (S212) may be preformed by utilizing the illustrated formula, in a similar manner as the generation of $EV(v_0)$ in FIG. 3, based on multiple Doppler detection points ($f_1, f_2, \ldots, f_n$), where each Doppler detection point has a corresponding Doppler detection point angle ($\theta_1, \theta_2, \ldots, \theta_n$), by applying the equation illustrated in FIG. 6 to generate a Least Squares Velocity Estimation (LSVE) as the $CEV(v_1)$. The formula illustrated in FIG. 6 further takes into account detected Reflection Points from Peaks in the SAR Range-Azimuth Spectrum (RPPSRAS) and $\Delta$ from FIG. 5.

Figure 7:
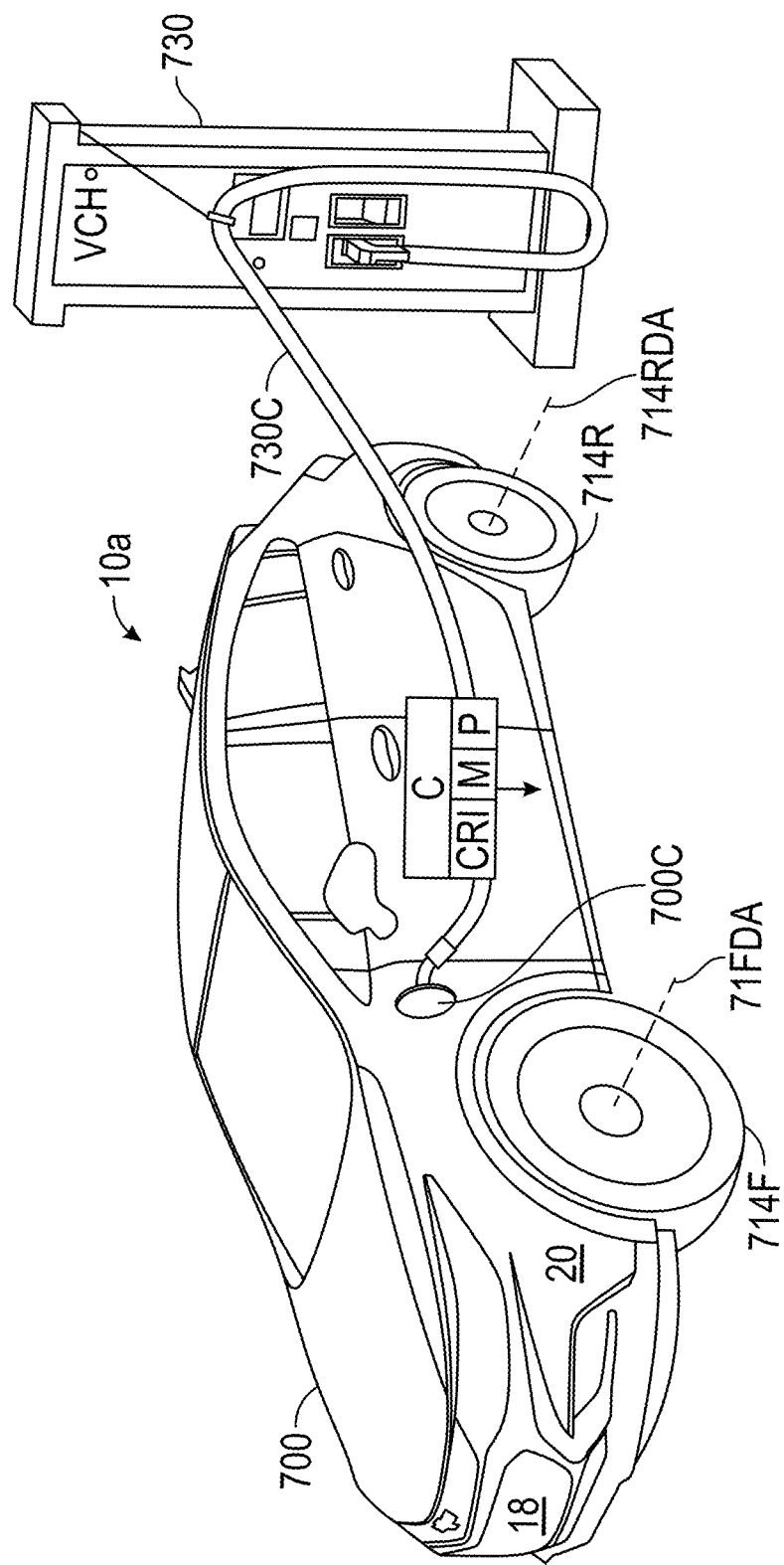
FIG. 7 illustrates a vehicle to which the present disclosure is applicable.

FIG. 7 illustrates a vehicle to which the present disclosure is applicable. As illustrated in FIG. 7, the motor vehicle 10a includes a vehicle body 700 having a charging receptacle 700C, front road wheels 714F, rear road wheels 714R, a radar unit 20 and a camera 18. The vehicle 10a further includes a battery electric system (not illustrated) including a high-voltage (HV) battery pack, such as one or more lithium-ion battery packs, or packs constructed another application suitable high-energy battery chemistry.

The front road wheels 714F rotate about a corresponding front drive axis 714FDA and the rear road wheels 714R rotate about a corresponding rear drive axis 714RDA when stored electrical charge in the battery electric system is discharged to power the front road wheels 714F and/or the rear road wheels 714R in different embodiments, depending on the specific drive configuration of the motor vehicle 10a. In the charging state illustrated in FIG. 7, a charging voltage (VCH) is provided from an offboard charging station 730 via a charging cable 730C, with the charging cable 730C terminating in a suitable charge connector, such as an SAE J1772 charge connector (not illustrated).

As further illustrated in FIG. 7, the vehicle 10a may further include computer-readable instructions (CRI) recorded in memory (M) of a control system (C), such as one or more digital computers or electronic control units, and executed by one or more processors (P). The memory (M) may include tangible, non-transitory memory, e.g., read only memory, whether optical, magnetic, flash, or other type. The control system (C) may also include application-sufficient amounts of random-access memory, electrically-erasable programmable read only memory, and similar memory, as well as a high-speed clock, analog-to-digital and digital-to-analog circuitry, and input/output circuitry and devices, as well as appropriate signal conditioning and buffer circuitry. The processes of the present disclosure may be embodied as CRI in the memory (M) and executed by the processor under control of the control system (C).

It is noted that the location of the radar unit 20, camera 18, memory (M), control system (C), and one or more processors (P) in FIG. 7 is only representative and the radar unit 20, camera 18, memory (M), control system (C), and one or more processors (P) may be located at any location on the vehicle where their function can be performed as disclosed herein. It is further noted that the vehicle 10a illustrated in FIG. 7 is merely one embodiment of the present disclosure. The present disclosure may be applied to other embodiments of a vehicle or other entity to which the present disclosure is applied.

The detailed description and the drawings or figures are supportive and descriptive of the present disclosure. However, the scope of the present disclosure is defined solely by the claims. While some of the best modes and other embodiments for carrying out the present disclosure have been described in detail, various alternative designs and embodiments exist for practicing the present disclosure as defined in the appended claims. Moreover, the present disclosure expressly includes combinations and sub-combinations of the elements and features disclosed herein.

Aspects of the present disclosure have been described in general terms and in detail with reference to the illustrated embodiments. Various modifications can be made by those skilled in the art without departing from the scope and spirit of the described embodiments. One skilled in the relevant art will also recognize that the disclosed methods and supporting hardware implementations may be alternatively embodied in other specific forms without departing from the scope of the present disclosure. Therefore, the foregoing disclosure is intended to be illustrative of the present disclosure without limiting of the inventive scope defined solely by the appended claims.

What is claimed is:

1. A method for correcting a synthetic aperture radar (SAR) image captured by a first vehicle of a second vehicle, the method performed repetitively as the first vehicle is in motion and comprising:
obtaining an SAR image of the second vehicle via a radar unit of the first vehicle;
obtaining a camera image of the second vehicle via a camera unit of the first vehicle;
determining an association between objects in the SAR image and objects in the camera image;
correcting a velocity estimation of the first vehicle based on the determined association; and
adjusting the SAR image based on the corrected velocity estimation.

2. The method of claim 1, wherein determining the association comprises identifying a pair of matching objects between the SAR image and the camera image.

3. The method of claim 1, wherein adjusting the SAR image comprises performing coherent combining back-projection according to the corrected velocity.

4. The method of claim 2, wherein correcting the velocity comprises finding an angle offset between the pair of matching objects.

5. The method of claim 2, wherein identifying the matching pairs comprises:
extracting first deep neural network (DNN) features from a coarse object detection of each of the at least one object in the SAR image to obtain a radar descriptor vector for the corresponding each of the at least one object in the SAR image;
extracting second DNN features from an object detection of the corresponding each of the at least object in the camera image to obtain a camera descriptor vector for each of the at least one object in the camera image; and
performing bipartite matching between the camera descriptor vector for each of the at least one object in the SAR image and the camera descriptor vector for the corresponding each of the at least one object in the camera image.

6. The method of claim 5, wherein identifying the matching pairs further comprises determining each of the at least one object in the SAR image and the corresponding at least one object in the camera image by adjusting DNN weights of the first DNN features and the second DNN features such that there is a minimum distance between each of the at least one object in the SAR image and the corresponding at least one object in the camera image.

7. The method of claim 1, wherein obtaining the SAR image and obtaining the camera image are performed at the same time.

8. A system for repetitively correcting a synthetic aperture radar (SAR) image captured by a first vehicle of a second vehicle while the first vehicle is in motion, the system comprising:
a radar unit of the first vehicle obtaining an SAR image of the second vehicle;
a camera unit obtaining a camera image of the second vehicle;
a processor configured to:
determine an association between at least one object in the SAR image and a corresponding at least one object in the camera image;
correct a velocity estimation of the first vehicle based on the determined association; and
adjust the SAR image based on the corrected velocity estimation.

9. The system of claim 8, wherein the processor is further configured to determine the association by identifying a pair of matching objects between the SAR image and the camera image.

10. The system of claim 8, wherein the processor is further configured to adjust the SAR image by performing coherent combining back-projection according to the corrected velocity.

11. The system of claim 10, wherein the processor is further configured to correct the velocity by finding an angle offset between the pair of matching objects.

12. The system of claim 9, wherein the processor is configured to identify the matching pairs by:
extracting first deep neural network (DNN) features from a coarse object detection of each of the at least one object in the SAR image to obtain a radar descriptor vector for the corresponding each of the at least one object in the SAR image;
extracting second DNN features from a coarse object detection of the corresponding each of the at least object in the camera image to obtain a camera descriptor vector for each of the at least one object in the camera image; and
performing bipartite matching between the camera descriptor vector for each of the at least one object in the SAR image and the camera descriptor vector for the corresponding each of the at least one object in the camera image.

13. The system of claim 12, wherein the processor is further configured to identify the matching pairs by determining each of the at least one object in the SAR image and the corresponding at least one object in the camera image by adjusting DNN weights of the first DNN features and the second DNN features such that there is a minimum distance between each of the at least one object in the SAR image and the corresponding at least one object in the camera image.

14. The system of claim 8, wherein the processor is further configured to obtain the SAR image and obtain the camera image at the same time.

15. A first vehicle for repetitively correcting a synthetic aperture radar (SAR) image while the first vehicle is in motion, the first vehicle comprising:
a vehicle body;
road wheels connected to the vehicle body;
a radar unit capturing synthetic aperture radar (SAR) images;
a camera capturing images; and
a control system, wherein the control system is configured to:
obtain an SAR image of a second vehicle via the radar unit;
obtain a camera image of the second vehicle via the camera unit;
determine an association between at least one object in the SAR image and a corresponding at least one object in the camera image;
correct a velocity estimation of the first vehicle based on the determined association; and adjust the SAR image based on the corrected velocity estimation.

16. The vehicle of claim 15, wherein the control system is further configured to determine the association by identifying a pair of matching objects between the SAR image and the camera image.

17. The vehicle of claim 15, wherein the control system is further configured to adjust the SAR image by performing coherent combining back-projection according to the corrected velocity.

18. The system of claim 16, wherein the control system is further configured to correct the velocity by finding an angle offset between the pair of matching objects.

19. The system of claim 16, wherein the control system is further configured to identify the matching pairs by:
   extracting first deep neural network (DNN) features from a coarse object detection of each of the at least one object in the SAR image to obtain a radar descriptor vector for the corresponding each of the at least one object in the SAR image;
   extracting second DNN features from an object detection of the corresponding each of the at least object in the camera image to obtain a camera descriptor vector for each of the at least one object in the camera image; and
   performing bipartite matching between the camera descriptor vector for each of the at least one object in the SAR image and the camera descriptor vector for the corresponding each of the at least one object in the camera image.

20. The vehicle of claim 15, wherein the control system is further configured to obtain the SAR image and obtain the camera image at the same time.

* * * * *